United States Patent
Jiang

(10) Patent No.: US 12,030,366 B2
(45) Date of Patent: Jul. 9, 2024

(54) REFRIGERATED COMPARTMENTS AND REFRIGERATED VEHICLES WITH FUNCTION OF DYNAMIC CONTROL OF TEMPERATURE FIELD

(71) Applicant: SHANDONG UNIVERSITY, Shandong (CN)

(72) Inventor: Zhaoliang Jiang, Jinan (CN)

(73) Assignee: SHANDONG UNIVERSITY, Jinan (CN)

(*) Notice: Subject to any disclaimer, the term of this patent is extended or adjusted under 35 U.S.C. 154(b) by 273 days.

(21) Appl. No.: 17/618,843

(22) PCT Filed: Sep. 30, 2019

(86) PCT No.: PCT/CN2019/109631
§ 371 (c)(1),
(2) Date: Dec. 13, 2021

(87) PCT Pub. No.: WO2021/035876
PCT Pub. Date: Mar. 4, 2021

(65) Prior Publication Data
US 2022/0355651 A1    Nov. 10, 2022

(30) Foreign Application Priority Data

Aug. 26, 2019   (CN) .......................... 201910789181.3

(51) Int. Cl.
*B60H 1/32*   (2006.01)
(52) U.S. Cl.
CPC ......... *B60H 1/3216* (2013.01); *B60H 1/3232* (2013.01)
(58) Field of Classification Search
CPC ................ B60H 1/3216; B60H 1/3232; B60H 1/00985; B60H 1/00021; B60H 1/00821;
(Continued)

(56) References Cited

U.S. PATENT DOCUMENTS

| 6,581,544 B1 | 6/2003 | Smith |
| 2012/0198866 A1* | 8/2012 | Zeidner ................. F25D 11/003 62/89 |

(Continued)

FOREIGN PATENT DOCUMENTS

| CN | 203133597 U | 8/2013 |
| CN | 103307005 A | 9/2013 |

(Continued)

OTHER PUBLICATIONS

Apr. 15, 2020 International Search Report issued in International Patent Application No. PCT/CN2019/109631.

(Continued)

*Primary Examiner* — Marc E Norman
(74) *Attorney, Agent, or Firm* — Oliff PLC

(57) ABSTRACT

A refrigerated compartment and refrigerated vehicle with dynamic control of a temperature field, including a compartment body. A refrigeration mechanism is fixed on a compartment body side wall and injects cold air into the compartment body. Steering mechanisms are fixed on the top wall of the compartment body, and each is connected with a fan. The fan accelerates the flowing cold air and the steering mechanism drives the fan to rotate and the change the cold air flow direction. Temperature sensors are equipped with the compartment body side walls and can detect the temperature. The temperature sensors are connected to a control mechanism arranged outside the compartment body and transmit detected information thereto. The control mechanism is connected to the steering mechanism, fan, and refrigeration mechanism through the speed regulator. The control mechanism controls the refrigeration mechanism working power and the operation of the steering mechanism and the fan.

9 Claims, 2 Drawing Sheets

(58) Field of Classification Search
CPC ...... B60H 1/00871; B60H 2001/00185; F25D 11/003
See application file for complete search history.

(56) References Cited

U.S. PATENT DOCUMENTS

| | | | |
|---|---|---|---|
| 2015/0231945 A1* | 8/2015 | Kehoe | B60H 1/241 |
| | | | 454/239 |
| 2016/0033185 A1* | 2/2016 | Motokawa | B60H 1/00535 |
| | | | 62/190 |
| 2017/0261255 A1* | 9/2017 | Saikkonen | G06F 3/167 |
| 2018/0272878 A1* | 9/2018 | Lee | B60L 53/665 |
| 2020/0217577 A1* | 7/2020 | Renikuntla | B60H 1/00985 |
| 2022/0009317 A1* | 1/2022 | Groben | B60H 1/3435 |

FOREIGN PATENT DOCUMENTS

| | | |
|---|---|---|
| CN | 104972868 A | 10/2015 |
| CN | 205805969 U | 12/2016 |
| CN | 107076496 A | 8/2017 |
| CN | 206606108 U | 11/2017 |
| CN | 107826027 A | 3/2018 |
| CN | 107839581 A | 3/2018 |
| CN | 109693600 A | 4/2019 |
| KR | 10-0916217 B1 | 9/2009 |
| KR | 10-1917750 B1 | 1/2019 |

OTHER PUBLICATIONS

Apr. 15, 2020 Written Opinion issued in International Patent Application No. PCT/CN2019/109631.
Apr. 3, 2020 Office Action issued in Chinese Patent Application No. 201910789181.3.
Aug. 13, 2020 Second Office Action issued in Chinese Patent Application No. 201910789181.3.

* cited by examiner

REFRIGERATED COMPARTMENTS AND REFRIGERATED VEHICLES WITH FUNCTION OF DYNAMIC CONTROL OF TEMPERATURE FIELD

CROSS-REFERENCE TO RELATED APPLICATION

This application claims the benefit of Chinese Application No. 201910789181.3 filed on 26 Aug. 2019, the disclosure of which is incorporated herein by reference.

TECHNICAL FIELD

The present application relates to the technical field of refrigerated vehicles, specifically to refrigerated compartments and refrigerated vehicles with function of dynamic control of temperature field.

BACKGROUND

In recent years, people have a high requirement for the safety and quality of products (such as food and medicine) with the gradual popularization and rapid development of cold chain transportation in China. Cold chain transportation requires that the whole process from processing to sales of products should be in the low temperature environment required by the product characteristics. However, due to the different changes in the transportation of goods and the variability of the transportation environment, it is difficult to maintain and control the temperature field in the cold chain transportation. Refrigerated vehicles are important equipment for cold chain transportation. In the process of refrigerated transportation, the temperature in the compartment should be kept at the best storage temperature of the transported goods as possible, and the temperature fluctuations should not be too large to avoid decay or frostbite of the goods. Moreover, the rear of a refrigerated compartment is far from the refrigeration equipment, so it is difficult to cool down, and the temperature distribution of the compartment is seriously uneven, which greatly affects the capacity of the refrigerated vehicles to transport perishable food. In addition, the same refrigerated vehicles often carry a variety of goods, and the optimal storage temperature for different goods is also different. Therefore, the stable, adjustable, and controllable temperature field in the compartment is a key factor to ensure the quality of goods transported by the refrigerated vehicles and to save energy and reduce consumption. The inventor found that the power of the refrigeration equipment of the refrigerated vehicle cannot be adjusted at present, and the temperature can only be maintained by frequently starting and stopping the refrigeration equipment. The refrigeration equipment will start when the temperature is higher to a certain degree than the set temperature, otherwise it will stop, which will cause a large temperature change. It's not conducive to the storage of goods. Moreover, the movement of the cold air in the refrigerated compartment cannot be controlled, and the temperature distribution is obviously uneven. In addition, the refrigerated vehicles cannot realize non-local real-time monitoring of the temperature in the refrigerated compartment, and the refrigeration process is opaque and uncontrollable.

SUMMARY

The purpose of the present application is to overcome the shortcomings of the prior art and provide a refrigerated compartment with function of dynamic control of temperature field, which can regulate the temperature field in the refrigerated compartment, so that the temperature distribution in the refrigerated compartment is uniform and the refrigeration effect is good.

A refrigerated compartment with function of dynamic control of temperature field, the refrigerated compartment comprising: a compartment body, a refrigeration mechanism, a variety of steering mechanisms, a variety of temperature sensors, a control mechanism, and a speed regulator; the refrigeration mechanism is fixed on a side wall for injecting cold air into the compartment body; the steering mechanisms are fixed on a top wall and each of the steering mechanisms is connected to a fan; the fan accelerates the flowing cold air and the steering mechanism drives the fan to rotate in any direction inside the compartment body to change a flow direction of the cold air; the temperature sensors installed on side walls for detecting a temperature in the compartment body are connected to the control mechanism arranged outside of the compartment body, and transmits the detected temperature information to the control mechanism; the control mechanism is connected to the steering mechanism, the fan, and the refrigeration mechanism through the speed regulator; the control mechanism controls a working power of the refrigeration mechanism and the operation of the steering mechanism and the fan according to the detected temperature information.

Further, the refrigeration mechanism is fixed on an upper part of the side wall of the compartment body, and includes an evaporator fixed on an inner side surface of the side wall of the compartment body and an external condensing unit fixed on an outer side surface of the side wall of the compartment body. The evaporator and the external condensing unit are connected by pipes, and an air outlet axis of the evaporator is arranged along the length direction of the compartment body.

Further, the evaporator and the external condensing unit are mounted on an inner side surface and an outer side surface of a same side wall of the compartment body.

Further, the steering mechanisms are arranged in multiple rows, and each row has a plurality of the steering mechanisms, and the plurality of the steering mechanisms in the same row are arranged evenly distributed along the axial direction of the air outlet of the evaporator.

Further, the steering mechanism includes a first steering gear fixedly connected to an inner side surface of the top wall of the compartment body; an output shaft of the first steering gear is connected to a connecting plate. A second steering gear is fixed on the connecting plate, and an output shaft of the second steering gear is fixedly connected to the fan. The first steering gear can drive the fan to rotate in a plane parallel to the top wall of the compartment body, and the second steering gear can drive the fan to rotate in the plane perpendicular to the top wall of the compartment body, thus realizing the rotation of the fan towards any direction in the compartment body.

Further, the temperature sensors are mounted on inner side surfaces of two opposite side walls of the compartment body, and the temperature sensors are evenly arranged along the length direction of the compartment body.

Further, the control mechanism is also connected to a GPRS communication module installed outside the compartment body, and the GPRS communication module is connected to a mobile phone terminal through a server. A temperature value set by the mobile phone terminal can be transmitted to the control mechanism, and the temperature value collected by the control mechanism can be transmitted to the mobile phone terminal.

Further, the connecting lines between the control mechanism, the temperature sensor, the refrigeration mechanism, the steering mechanism, and the fan are arranged in a cable pipe, and the cable pipe is fixedly connected to the compartment body.

The invention also discloses a refrigerated vehicle, which adopts the refrigerated compartment with the function of dynamic control of the temperature field.

Further, a display screen connected to the control mechanism is installed in the cab of the refrigerated vehicles. The control mechanism can display the collected temperature information on the display screen, and can also transmit the set temperature value to the control mechanism.

BENEFICIAL EFFECTS

1. The refrigerated compartment of the present application can collect the temperature of each position in the compartment body by setting the temperature sensors, and by comparing the collected temperature value with the set temperature value, the power of the refrigeration mechanism can be controlled in real time, and by adjusting the size of the cold air sent by the refrigeration mechanism, the frequent start and stop of the refrigeration mechanism can be avoided and the temperature field in the compartment body is more stable. At the same time, according to the acquisition of temperature information, the operation of the steering mechanism and the fan can be controlled to accelerate the cold air and change the flow direction of the cold air, thereby realizing the dynamic control of the temperature field in the compartment body, reducing the dead angle of temperature control in the compartment body, making the temperature distribution in the compartment body more even, and the refrigeration effect of the goods better.

2. According to the refrigerated compartment of the present application, the installation of the steering mechanism and the fan does not need to change the original structure of the compartment, and the installation and use are convenient.

3. The remote real-time monitoring function is obtained by connecting the control mechanism and the server through the GPRS communication module, which improves the transparency and controllability of the refrigerated vehicles in the refrigeration and transportation process.

4. According to the refrigerated compartment of the present application, the evaporator of the refrigeration mechanism and the external condensing unit are respectively arranged on the inner and outer side surfaces of the same side wall of the compartment body, which minimizes the distance between the evaporator and the external condensing unit, and facilitates the design of piping between the evaporator and the external condensing unit.

BRIEF DESCRIPTION OF THE DRAWINGS

The accompanying drawings constituting a part of the present application are used to provide further understanding of the present application. The exemplary embodiments of the present application and the descriptions thereof are used to explain the present application, and do not constitute an improper limitation of the present application.

wherein, 1: top wall of the compartment body, 2: bottom wall of the compartment body, 3: first side wall of the compartment body, 4: second side wall of the compartment body, 5: evaporator, 5-1: air outlet, 5-2: return air opening, 6: steering mechanism, 6-1: first steering gear, 6-2: connecting plate, 6-3: second steering gear, 7: fan, 8: temperature sensor, 9: PLC controller, 10: speed governor, 11: GPRS communication module, 12: server, 13: mobile phone terminal, 14: display screen, 15: cable pipe, 16: external condensing unit.

DETAILED DESCRIPTION

It should be noted that the following detailed descriptions are exemplary and intended to provide further explanation of the present application. Unless otherwise specified, all technical and scientific terms used herein have the same meaning as commonly understood by a person of ordinary skill in the technical field to which the present application belongs.

It should be noted that terms used herein are only for describing specific implementations and not intended to limit exemplary implementations according to the present application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

For convenient description, the words of "upper", "lower", "left", and "right" in the present application, if any, refer to directions corresponding to the up, down, left, and right directions of the drawings themselves, and do not limit the structure, but merely facilitate the descriptions of the present application and simplify the descriptions, rather than indicating or implying that the referenced device or element must have a particular orientation, be constructed and operated in a particular orientation, and thus should not be construed as limiting the present application.

As introduced in the background, the power of the refrigeration equipment of the current refrigerated vehicles is not adjustable, and the temperature distribution section in the compartment body is uniform, and the refrigeration effect is not good. In view of the above-mentioned problems, the present application proposes a refrigerated compartment with a function of dynamic control of temperature field.

Figure 1:
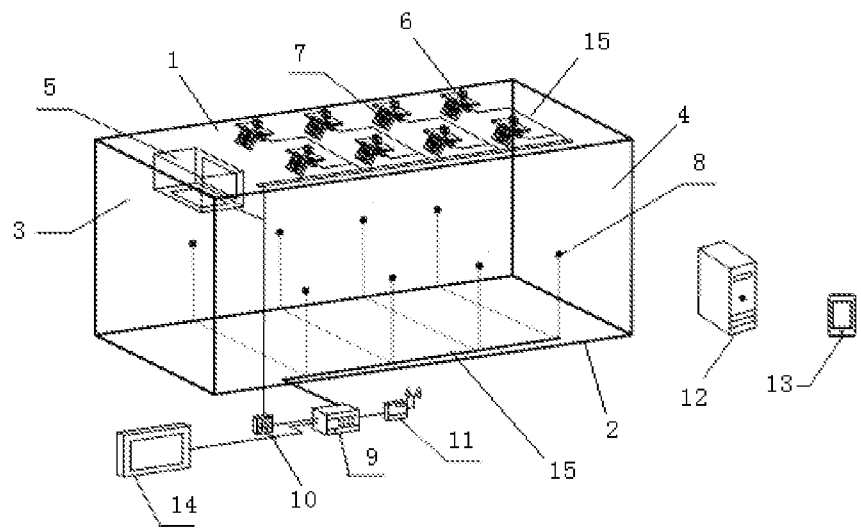
FIG. 1 is a schematic diagram of an overall structure of an example 1 of the present application.
Figure 2:
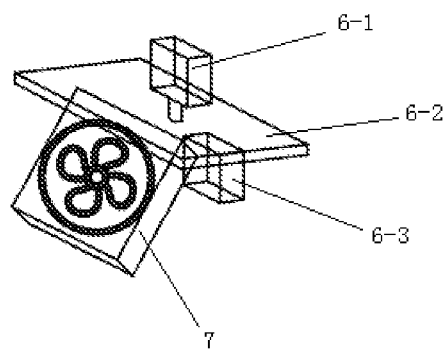
FIG. 2 is a schematic diagram of assembling a steering mechanism and a second fan in the example 1 of the present application.

Example 1 is a typical implementation of the present application. As shown in FIGS. 1-2, a refrigerated compartment with a function of dynamic control of a temperature field, includes a compartment body which is a rectangular parallelepiped structure and includes a top wall of the compartment body 1, a bottom wall of the compartment body 2 and a first side wall of the compartment body 3, a second side wall of the compartment body 4, a third side wall of the compartment body, and the fourth side wall of the compartment body disposed between the top side wall and the bottom side wall of the compartment body. The first side wall and the second side wall of the compartment body are arranged opposite, and the third side wall and the fourth side wall of the compartment body are arranged opposite. A refrigeration mechanism is installed on an upper part of the first side wall of the compartment body, and the refrigeration mechanism adopts an existing refrigeration mechanism for the refrigerated vehicles, including the evaporator 5 and the external condensing unit 16. The evaporator and the external condensing unit are connected by pipelines. The evaporator is arranged on an upper part of the inner side surface of the first side wall of the compartment body; the external condenser unit is arranged on an upper part of the outer side surface of the first side wall of the compartment body. Both the evaporator and the external condensing unit are installed on the upper part of the first side wall of the compartment body, which minimize the distance between the evaporator and the external condensing unit and facilitate the design of the pipeline. The evaporator adopts an existing evaporator structure and has an air outlet 5-1, a return air opening 5-2, and a first fan. The evaporator can cool the air to form cold air, and the cold air is injected from the air outlet into the interior of the compartment body under the action of the first fan. The cold air passes through the cargo stacking area to be heated, and then flows out of the evaporator from the return air opening to realize a refrigeration cycle. It adopts the working principle of the existing evaporator, which will not be described in detail here. The axis of the air outlet of the evaporator is arranged along the length direction of the compartment body, that is, the plane where the air outlet is located is parallel to the first side wall of the compartment body.

Two rows of steering mechanisms are fixed on the inner side surface of the top wall of the compartment body, each row has multiple steering mechanisms 6, and the multiple steering mechanisms in the same row are arranged along the length of the compartment body, and each steering mechanism is connected with a second fan 7, the second fan adopts a direct-current fan, and the steering mechanism can drive the second fan to rotate in any direction in the compartment body.

The steering mechanism includes a first steering gear 6-1 fixed on the inner side surface of the top wall of the compartment body; and an output shaft of the first steering gear is firmly connected to a connecting plates 6-2; and the connecting plate is fixed on a second steering gear 6-3; and an output shaft of the second steering gear is fixedly connected to the second fan. The first steering gear can drive the fan to rotate in a plane parallel to the top compartment wall of the compartment body, and the second steering gear can drive the fan in the plane perpendicular to the top wall of the compartment body to realize the rotation of the fan towards any direction in the compartment body. When the cold air blown from the evaporator flows through the second fan, the second fan can accelerate the cold air, and multiple second fans can accelerate the cold air in multiple stages. At the same time, by changing the direction of the second fan through the joint action of the second steering gear and the first steering gear, the flow direction of the cold air can be changed.

A plurality of temperature sensors 8 are fixed on inner side surfaces of a third side wall and a fourth side wall of the compartment body, and the plurality of temperature sensors are arranged along the length direction of the compartment body, and the temperature sensors can collect temperature information of different areas in the compartment body. The temperature sensors are connected to a control mechanism arranged outside the compartment body. The control mechanism adopts a PLC controller 9, and the temperature information collected by the temperature sensors can be transmitted to the PLC controller.

The PLC controller is connected to the first fan of the evaporator via a speed governor 10, and the PLC controls the power of the first fan through the speed governor according to the collected temperature information, so as to control the amount of cold air sent by the refrigeration mechanism in real time according to the actual temperature in the compartment body and the set temperature, adjust the temperature in the compartment body, and avoid the frequent start and stop of the refrigeration mechanism.

The first steering gear, the second steering gear, and the second fan are also connected to the PLC controller. The PLC controller can control the operation of the first steering gear, the second steering gear, and the second fan according to the collected temperature information, and change the speed and the flow direction of the cold air.

The PLC controller controls the power of the refrigeration mechanism and uses the steering mechanism and the second fan to control the speed and flow direction of the cold air, realizing real-time dynamic control of the temperature field in the compartment body, ensuring the uniform distribution of the temperature field in the compartment body, and improving the refrigeration effect.

The connecting lines between the PLC controller and the temperature sensors, the steering mechanisms, and the refrigeration mechanisms are arranged in the cable pipe 15. The cable pipe is fixedly connected to the compartment body, and the cable pipe is used to protect the connecting line and prevent the connecting line damaged.

The PLC controller is also connected to a GPRS communication module 11 provided outside the compartment body. The GPRS communication module is connected to a mobile phone terminal 13 via a server 12. The temperature information collected by the PLC controller can be transmitted to the mobile terminal via the GPRS communication module and server, and displayed on the mobile terminal. The operator can also input the temperature setting value through the mobile phone terminal and transmit it to the PLC controller, realizing the real-time remote monitoring of the temperature in the compartment body, and improving the transparency and controllability of the refrigerated vehicles during the refrigeration and transportation process.

Example 2

Figure 3:
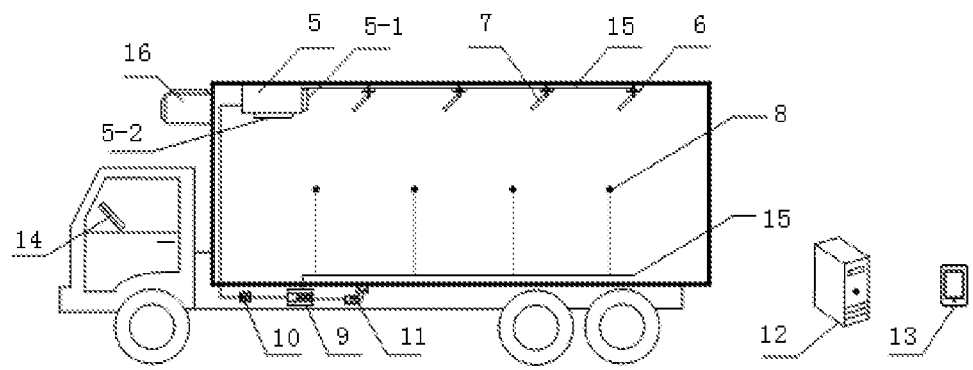
FIG. 3 is a schematic diagram of an overall structure of an example 2 of the present application.
Figure 4:
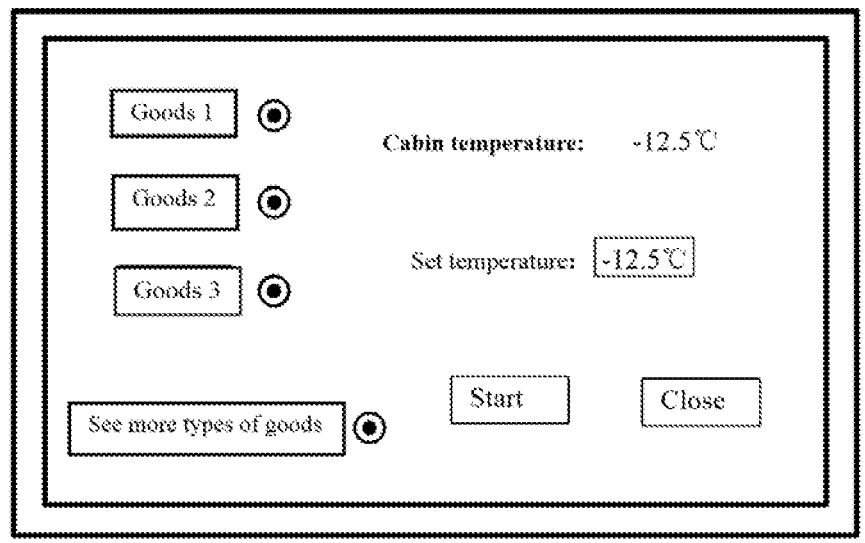
FIG. 4 is a schematic diagram of an interface of a display screen in the example 2 of the present application.
Figure 5:
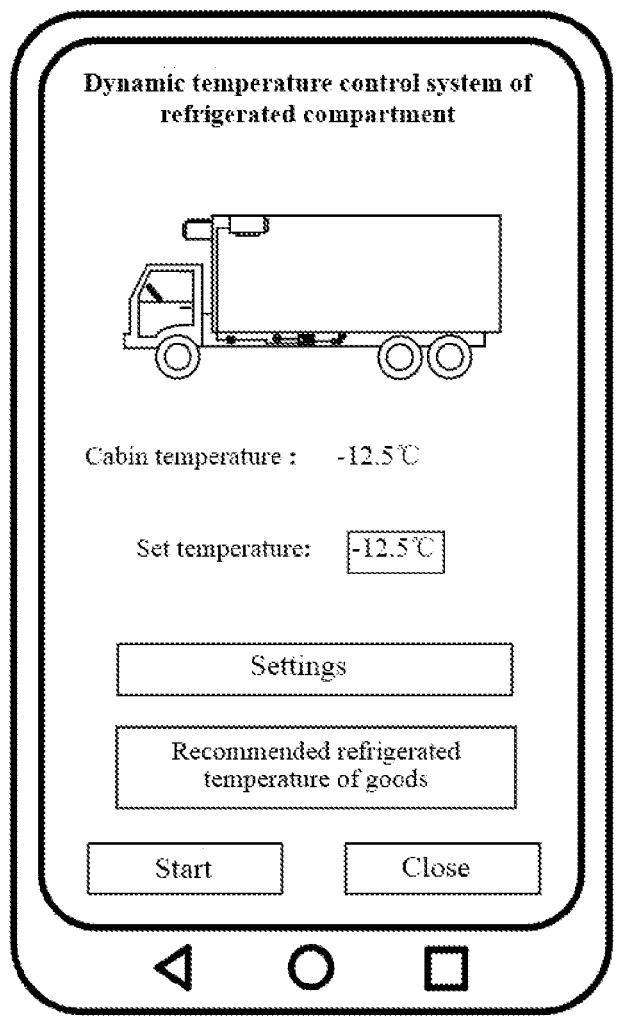
FIG. 5 is a schematic diagram of an interface of a mobile phone terminal in the example 2 of the present application.

This example discloses a refrigerated vehicle, as shown in FIG. 3, which adopts the compartment body with a function of dynamic control of the temperature field as described in example 1; the first side wall of the compartment body is arranged close to the front of the refrigerated vehicle; the PLC controller and the GPRS communication module can be installed on the refrigerated vehicle according to the actual conditions; a display screen 14 is also provided in the cab of the refrigerated vehicle; the display screen adopts a touch screen, and the display screen is connected to the PLC controller. As shown in FIG. 4, the display screen can display the temperature information collected by the temperature sensor, and the operator can also input the set temperature value to the PLC controller through the display screen. As described in FIG. 5, the temperature information collected by the PLC controller can also be transmitted to the mobile phone terminal through the GPRS communication module and the server, the mobile phone terminal can display the collected temperature information value, and the operator can also input the set temperature value to the PLC controller through the mobile phone terminal.

The refrigerated vehicles of this example perform real-time dynamic control of the temperature field in the compartment body to ensure uniform temperature distribution in the compartment body and improve the refrigeration effect and can be made by reforming the existing refrigerated compartment without changing the original refrigerated compartment structure, and have simple structure and low manufacturing cost.

The foregoing descriptions are merely preferable embodiments of the present application, but are not intended to limit the present application. The present application may include various modifications and changes for a person skilled in the art. Any modification, equivalent replacement, or improvement made within the spirit and principle of the present application shall fall within the protection scope of the present application.

The invention claimed is:

1. A refrigerated compartment with a temperature field dynamic control function, the refrigerated compartment comprising:
    a compartment body;
    a refrigeration mechanism that is fixed on a side wall of the compartment body and that is configured to inject cold air into the compartment body;
    a plurality of steering mechanisms that is fixed on a top wall of the compartment body, wherein:
        each of the plurality of steering mechanisms comprises a first steering gear fixedly connected to an inner side surface of the top wall of the compartment body and a second steering gear fixed on a connecting plate connected to an output shaft of the first steering gear,
        an output shaft of the second steering gear is fixedly connected to a fan that is configured to accelerate the cold air flowing therethrough, and
        the first steering gear drives the fan to rotate in a plane parallel to the top wall of the compartment body, and the second steering gear drives the fan to rotate in a plane perpendicular to the top wall of the compartment body, to realize a rotation of the fan towards any direction inside the compartment body in order to change a flow direction of the cold air; and
    a plurality of temperature sensors that is installed on side walls of the compartment body and that is connected to a control mechanism arranged outside of the compartment body, the plurality of temperature sensors being configured to detect temperature in the compartment body and transmit information of the detected temperature to the control mechanism;
    wherein the control mechanism is connected to the plurality of steering mechanisms, the fans, and the refrigeration mechanism, and is configured to control a working power of the refrigeration mechanism and an operation of the plurality of steering mechanisms and the fans according to information of the detected temperature.

2. A refrigerated compartment according to claim 1, wherein the refrigeration mechanism is fixed to an upper part of the side wall of the compartment body, and includes an evaporator fixed on an inner side surface of the side wall of the compartment body and an external condensing unit fixed on an outer side surface of the side wall of the compartment body; the evaporator and the external condensing unit are connected by pipes, and an air outlet axis of the evaporator is arranged along a length direction of the compartment body.

3. A refrigerated compartment according to claim 2, wherein the evaporator and the external condensing unit are mounted on an inner side surface and an outer side surface of a same side wall of the compartment body, respectively.

4. A refrigerated compartment according to claim 1, wherein the plurality of steering mechanisms are arranged in multiple rows, and each row has some of the plurality of steering mechanisms, and the some of the plurality of steering mechanisms in the same row are arranged evenly distributed along the axial direction of the air outlet of the evaporator.

5. A refrigerated compartment according to claim 1, wherein the plurality of temperature sensors are mounted on inner side surfaces of two opposite side walls of the compartment body; and the plurality of temperature sensors are evenly arranged along a length direction of the compartment body.

6. A refrigerated compartment according to claim 1, wherein the control mechanism is further wirelessly connected to a mobile phone terminal through a server and is communicated with the mobile phone terminal based on a GPRS (General Packet Radio Service); a temperature value set by the mobile phone terminal can be transmitted to the control mechanism, and the temperature value collected by the control mechanism can be transmitted to the mobile phone terminal.

7. A refrigerated compartment according to claim 1, wherein connecting lines between the control mechanism, the plurality of temperature sensors, the refrigeration mechanism, the plurality of steering mechanisms and the fans are arranged in a cable pipe; and the cable pipe is fixedly connected to the compartment body.

8. A refrigerated vehicle comprising the refrigerated compartment according to claim 1.

9. A refrigerated vehicle according to claim 8, wherein a display screen connected to the control mechanism is installed in the cab of the refrigerated vehicle; the control mechanism displays the information of the detected temperature on the display screen, and transmits a set temperature value to the control mechanism.

* * * * *